(12) United States Patent
Collard et al.

(10) Patent No.: US 7,673,296 B2
(45) Date of Patent: Mar. 2, 2010

(54) METHOD AND SYSTEM FOR OPTIONAL CODE SCHEDULING

(75) Inventors: Jean-Francois Collard, Sunnyvale, CA (US); Alan H. Karp, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1616 days.

(21) Appl. No.: 10/902,199

(22) Filed: Jul. 28, 2004

(65) Prior Publication Data

US 2006/0026582 A1 Feb. 2, 2006

(51) Int. Cl.
G06F 9/45 (2006.01)

(52) U.S. Cl. ........................... 717/161

(58) Field of Classification Search ......... 717/129–131, 717/136, 140, 141, 161, 151–152, 154, 158; 702/186; 709/224; 712/214
See application file for complete search history.

(56) References Cited

U.S. PATENT DOCUMENTS

| | | | | |
|---|---|---|---|---|
| 5,787,286 A | * | 7/1998 | Hooker | 717/130 |
| 5,835,776 A | * | 11/1998 | Tirumalai et al. | 717/161 |
| 5,920,716 A | * | 7/1999 | Johnson et al. | 717/141 |
| 6,505,345 B1 | * | 1/2003 | Chen et al. | 717/154 |
| 6,658,471 B1 | * | 12/2003 | Berry et al. | 709/224 |
| 6,836,884 B1 | * | 12/2004 | Evans et al. | 717/140 |
| 6,968,546 B2 | * | 11/2005 | Lueh | 717/158 |
| 7,266,809 B2 | * | 9/2007 | Tsubata et al. | 717/129 |

OTHER PUBLICATIONS

Hollingsworth et al, "Dynamic Program instrumentation for Scalable Performance Tools", IEEE 1994, pp. 841-850.*

* cited by examiner

Primary Examiner—Tuan Anh Vu (57) ABSTRACT

A method of scheduling optional instructions in a compiler targets a processor. The scheduling includes indicating a limit on the additional processor computations that are available for executing an optional code, generating one or more required instructions corresponding to a source code and one or more optional instructions corresponding to the optional code used with the source code and scheduling all of the one or more required instructions with as many of the one or more optional instructions as possible without exceeding the indicated limit on the additional processor computations for executing the optional code.

37 Claims, 7 Drawing Sheets

METHOD AND SYSTEM FOR OPTIONAL CODE SCHEDULING

BACKGROUND OF THE INVENTION

The present invention relates to compilers and programming languages. A compiler is generally used to translate a high-level programming language to a machine language that more closely matches the instruction set used to execute on a target processor. During this conversion or translation process, the compiler analyzes the source code being compiled in a front-end portion and then uses a backend portion to synthesize the results produced from the front-end into an object with executable instructions. Many times the compiler is able to produce code faster and more efficiently than would be possible hand-coding.

In addition, the compiler may also include various optional codes along with the source code being compiled. These optional codes including debug codes to detect runtime errors, tracing and logging codes to capture information, and other more speculative runtime optimization codes that could be used to potentially improves overall performance at runtime. During debugging of an application, these executables with the optional codes are useful as they provide information, warnings, and clues on areas of the code that may be problematic. For example, debug codes that check pointer and array boundaries are important as they either prevent or detect serious errors that could result in data corruption or otherwise undetected errors.

Unfortunately, adding any or all of these types of optional codes to the compiled source code tends to increase the computational requirements for processing the executable object and may slow down the execution significantly. Typically, the execution overhead associated with adding these optional codes using conventional compilers is proportional to the number of optional codes added. This overhead for processing the optional instructions is typically not acceptable to users and end users. Consequently, production compilations of the source code are recompiled and stripped of any and all optional codes to increase performance. End users enjoy the increased performance but risk suffering corrupted data, experiencing the effects of undetected errors during runtime and are limited with information to assist in the debugging or analysis process.

In general, current compilers do not deal with optional instructions in an acceptable manner. While the optional instructions provide important information to both end-users and developers, there remains no method of including the optional instructions without impacting performance. Developers need to maintain and sometimes distribute two versions of software or two codebases: one executable is compiled to include all the optional instructions while another executable is stripped of all option instructions and all the ancillary information described. This makes maintaining the codebase for a software product that much more complex as two executables need to be maintained instead of one.

BRIEF DESCRIPTION OF THE DRAWINGS

Like reference numbers and designations in the various drawings indicate like elements.

SUMMARY OF THE INVENTION

One aspect of the present invention features a method of scheduling optional instructions in a compiler targeting a processor. The scheduling includes indicating a limit on the additional processor computations that are available for executing an optional code, generating one or more required instructions corresponding to a source code and one or more optional instructions corresponding to the optional code used with the source code and scheduling all of the one or more required instructions with as many of the one or more optional instructions as possible without exceeding the indicated limit on the additional processor computations for executing the optional code.

DETAILED DESCRIPTION

Aspects of the present invention are advantageous in at least one or more of the following ways. Compilers often add optional instructions into code for logging statistical information about an application, debugging an application when it aborts, and many other uses. Implementations of the present invention enhance the compilers adding these optional instructions with minimal or reduced impact on the performance of the applications during runtime. By scheduling the optional instructions in otherwise unused slots available for execution, the optional instructions add little or no perceived computational burden to the processor. For example, the source code of an application compiled with debug instructions using implementations of the present invention is able to run as quickly with the optional debug code as it would without the optional debug code.

Implementations of the present invention are also advantageous as they allow users compiling source code to indicate the amount of computational overhead the compiler and scheduler should allocate to the optional instructions. The compiler and scheduler insert optional instructions such that the runtime performance of an application is reduced, if at all, in a controlled manner. Instead of adding all the optional instructions, the compiler and scheduler work together adding instructions if the overall performance is not reduced substantially below some specified performance characteristic. For example, this allows a user compiling source code to have a limited amount of optional debug or logging code inserted without completely sacrificing runtime performance in exchange.

Additionally, implementations of the present invention at a minimum facilitate including optional instructions with all compiled versions of source code or an application. The scheduler portion of the compiler can be instructed to only add optional instructions if the overall effect would have no additional computational burden on the processor compared with the source code compiled without the optional instructions. As a result, the compiled source code or application only schedules the optional instructions when the execution slots for a processor would have otherwise went unused. This simplifies software distribution as a single executable can be distributed. In accordance with implementations of the present invention, there is no perceived computational difference between the two compilations processed with or without the optional instructions.

Figure 1:
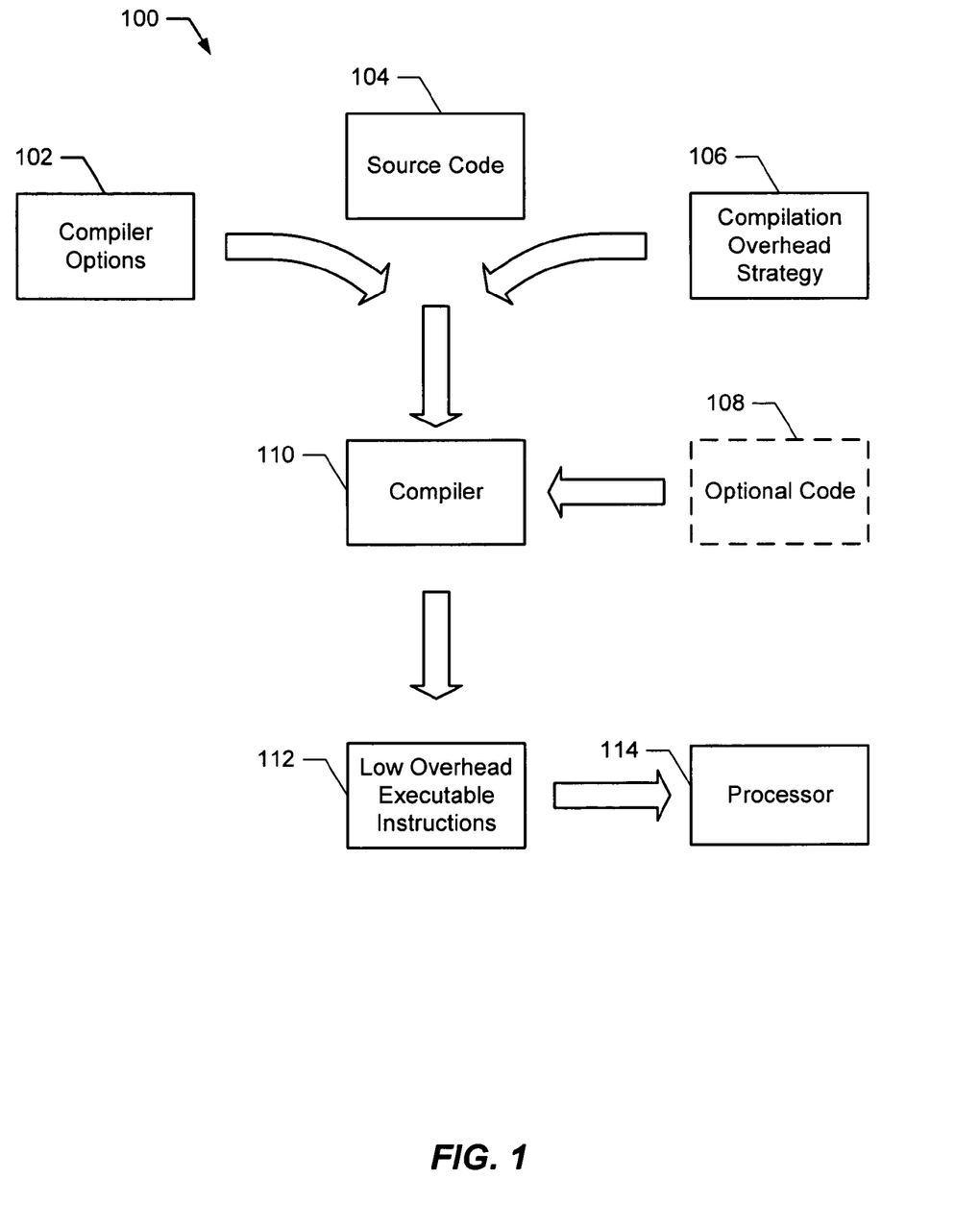
FIG. 1 is a schematic diagram illustrating a development environment used for compiling source code into low overhead executable instructions for execution on a processor in accordance with implementations of the present invention.

Referring to FIG. 1, a schematic diagram illustrates a development environment 100 used for compiling source code 104 into low overhead executable instructions 112 (hereinafter referred to as executable 112) for execution on a processor 114 in accordance with implementations of the present invention. Development environment 100 includes compiler options 102, source code 104, a compilation overhead strategy 106, optional code 108, and a compiler 110 designed in accordance with implementations of the present invention. For purposes of explanation, source code 104 and optional code 108 can be specified using different programming languages and are processed by compiler 110 into required instructions (not illustrated) and optional instructions respectively for a particular target processor 114. Optional instructions are represented by optional code 108. In general, code can be distinguished from instructions because the instructions are generated by the compiler to be executed by a processor while code may not be in the proper format for immediate execution by the processor without further processing. For example, executable 112 has been compiled into instructions ready for execution by processor 114 but source code 104 cannot be directly executed on processor 114.

In operation, compiler options 102 and compilation overhead strategy 106 provide guidance to compiler 110 when processing source code 104 and optional code 108. Different options specified in compiler options 102 cause the compiler to operate on source code 104 using various features built into compiler 110. For example, the compiler options can indicate that the compiler cross-compile for a different target processor (other than the processor on the computer that compiler 110 is running on), optimize the final executable to execute quickly or in a small memory area, compile source code modules without linking them together, or insert optional code 108 in accordance with implementations of the present invention. For example, optional code 108 can include debug codes, tracing and logging codes, and speculative run-time optimization codes.

In one implementation, debug codes are compiled into instructions that perform various checks when executable 112 is being processed by processor 114. The checks including may include checking boundaries for pointers and arrays, validating memory and storage addresses or range of addresses, checking various data assertions, checking certain register contents, and any other verification useful for debugging executable 112. In comparison, tracking and logging codes inserted into executable 112 by compiler 110 may cause executable 112 to dump the contents of various registers and variables out during runtime to a log file to analyze later. Speculative runtime optimization codes may include additional information used for improving the efficiency of certain complex calculations and computationally intensive processes performed during runtime. For example, a speculative runtime optimization could include having code that inserts a default value in lieu of performing a complex calculation when certain other runtime conditions are met. This could save significant processing time and tend to improve the operation of executable 112 if the complex calculation could be avoided and the default value used in the calculation instead.

In each of the aforementioned examples, compiler 110 inserts optional codes 108 into the compiled version of source code 104. These optional codes 108 may be created during compilation by compiler 110 in accordance with the specific code in source code 104 or may exist a priori as represented by optional code 108. For example, compiler 110 may insert certain debug codes to validate values used in a "for loop", "while loop", or address range identified in source code 104. Other optional code 108 may already be inline with source code 104 as pre-processor commands to compiler 110. These pre-existing codes may directly instruct compiler 110 to insert other types of debug or logging codes around certain areas of code in source code 104 known to have runtime bugs or that need close tracking or attention.

Compilation overhead strategy 106 limits the amount of additional computations made by processor 114 to process optional code 108. Implementations of the present invention may use one of many different compilation overhead strategy 106 to control the amount of optional code 108 scheduled for execution on processor 114. A "no overhead strategy for optional instructions" is one type of compilation overhead strategy 106 that schedules optional code 108 on processor 114 without increasing computations on processor 114. This strategy ensures that executable 112 runs as efficiently on processor 114 with optional code 108 as it would without optional code 108.

In contrast, "block-wise percentage limit strategy for optional instructions" is another compilation overhead strategy 106 that ensures that the overhead to execute the optional codes in a basic block of code in source code 104 requires no more than a certain specified percentage of additional computations by processor 114. In this context, a basic block is a straight-line piece of code without any jumps or jump targets contained within. The "jump targets" typically provided an entrance to the basic block and identify the start of a block while the "jumps" provide an exit to the basic block.

Yet another compilation overhead strategy 106 includes "an aggregate percentage limit strategy for optional instructions" that instead limits the amount of additional computations for executing optional instructions 108 based upon an overall number of instructions to be executed. In this strategy, executable 112 may tend to have basic blocks during runtime that require more computations on processor 114 than other areas but overall suffers no more than a specified percentage increase in computations for optional instructions 108. While further details on each of these strategies is described later herein, it is contemplated that many other strategies could also be implemented in accordance with implementations of the present invention. Accordingly, these compilations overhead strategies described herein are only examples and many other approaches would be expected.

Figure 2:
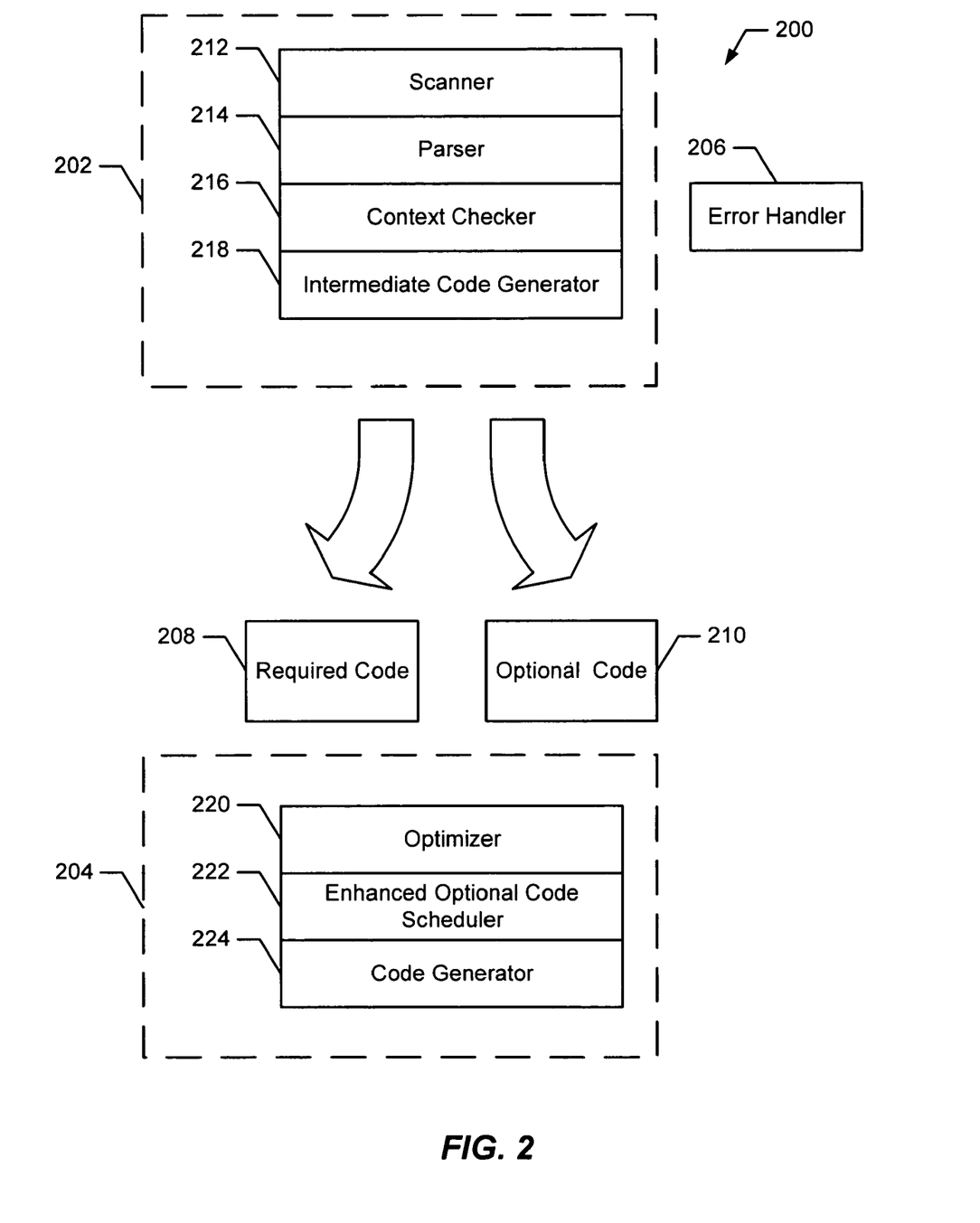
FIG. 2 is a schematic illustration of a compiler that implements scheduling of instructions on a processor in accordance with implementations of the present invention.

FIG. 2 is a schematic illustration of a compiler that implements scheduling of instructions on a processor in accordance with implementations of the present invention. Broadly described, compiler 200 includes a front-end 202, a backend 204, and an error handler 206. Overall, compiler 200 uses front-end 202 and backend 204 to take source code in a high-level language and generate instructions in an object that more closely resembles the machine language of a targeted processor on a computer. In accordance with implementations of the present invention, compiler 200 also processes optional codes and selectively inserts these codes depending on the particular compilation overhead strategy specified.

Implementations of the present invention most closely affect scheduling of instructions however one or more components of both front-end 202 and backend 204 may be modified in accordance with implementations of the present invention. In FIG. 2, front-end 202 perform various analyses on the source code. Scanner 212 implements a lexical analyzer that scans characters into lexical units or tokens. Typically, scanner 212 receives a stream of characters and generates a stream of valid tokens according to a finite state machine. Parser 214 validates and combines the stream of valid tokens into a parse tree that represents the program described by the source code. The structure of the parse tree representing the program generally obeys a context-free grammar and is implemented using a push-down automata or stack. Context checker 216 takes parse tree from parser 214 and checks certain static conditions based on the semantics of the program and in accordance with an attribute grammar. The contextual analysis annotates and enhances the parse tree to include additional information describing the static semantics of the program. Intermediate code generator 218 then takes the resulting annotated parse tree and attempts to both simplify and generate more efficient required code 208 and optional code 210 while preserving the semantics of the original source code. Error handler 206 includes all the routines used to handle lexical and/or semantic errors or problems that may arise in front-end 202.

Backend 204 of the compiler is sometimes associated with the synthesis phase of compilation process. During synthesis, backend 204 is preparing both required code 208 and optional code 210 for execution on a targeted processor. Using knowledge of the target processor, optimizer 220 may change the structure of the annotated parse tree and reduce its size or even create an equivalent parse tree that code generator 224 can then produce even more efficient instructions. For example, optimizations performed by optimizer 220 may include constant folding, loop-constant code motion, common subexpression elimination, strength reduction, induction variable elimination, and many other types of optimizations.

In one implementation of the present invention, enhanced optional code scheduler 222 takes the optimized results from optimizer 220 and attempts to schedule as many of the optional instructions along with the required instructions as permitted by the particular compilation overhead strategy specified. As previously described, a few of these compilation overhead strategies include: a no overhead strategy for optional instructions, a block-wise percentage limit strategy for optional instructions, and an aggregate percentage limit strategy for optional instructions. Alternate implementations of the present invention may not be implemented as a discrete enhanced optional code scheduler 222 as illustrated in FIG. 2 and instead may be divided over and integrated with one or more modules associated with either front-end 202, backend 204 or a combination of one or more modules associated with both front-end 202 and backend 204.

Once instructions derived from required code 208 and optional code 210 are scheduled, code generator 224 converts the intermediate code into an object of instructions corresponding to the original program or source code yet expressed in the native language of the target processor or machine. For example, the resulting object can be an actual executable binary, assembly code, virtual machine code for a virtual machine or may even be another high-level programming language. In the event the resulting object is a low-level executable binary object then code generator 224 may need to address certain aspects of the target processor including: data formatting (i.e., little endian/big endian), machine instruction syntax, registers, program layout, variable allocation, and other processor dependent characteristics.

Figure 3:
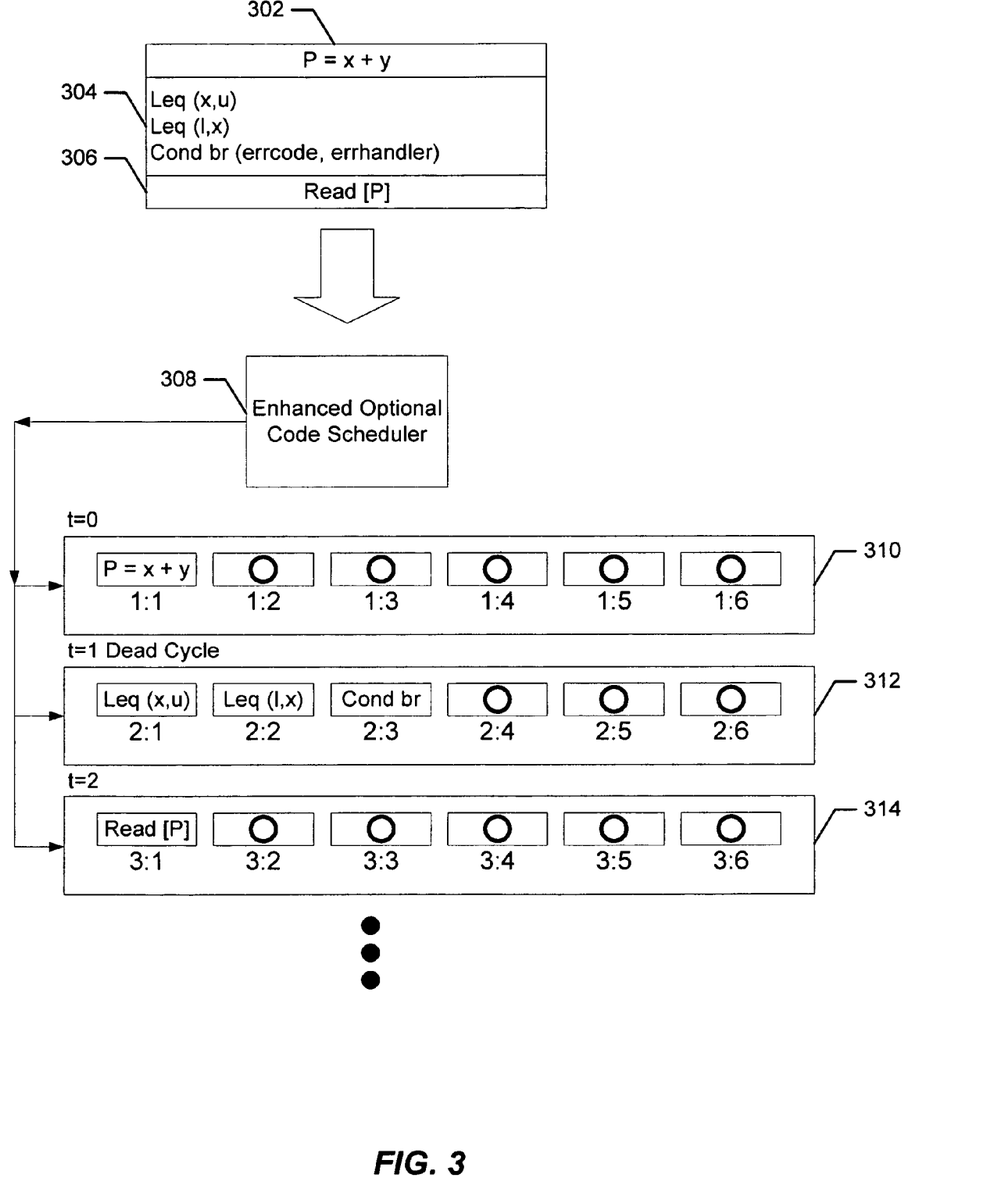
FIG. 3 is a schematic illustrating a fragment of required and optional instructions being scheduled in accordance with implementations of the present invention.

FIG. 3 is a schematic illustrating a fragment of required and optional instructions being scheduled in accordance with implementations of the present invention. In this example, the fragment includes required instruction 302 and 306 and optional instructions 304 positioned therebetween. Required instructions 302 sets the variable of "P" to the sum of independent variables "x" and "y" while required instruction 306 then reads the value stored in the address associated with variable "P". It should be appreciated that optional instructions 304 perform debugging type operations however any optional instructions including the one or more types of optional instructions previously described could be used instead.

To prevent possible data corruption or miscalculation, optional instructions 304 represented in pseudo-code check the address associated with a variable "x" is within a valid range of addresses. The first of optional instructions 304 (i.e., Leq (x,u)) determines that the address of variable "x" is less than or equal to an upper bound address "u" while the second of optional instructions 304 (i.e., Leq (l,x)) determines that the lower bound address "l" is less than or equal to the address of variable "x". If both these conditions are met, then required instruction 306 performs the operation of reading the value at the address associated with variable "P". Of course, if either assertion from optional instructions 304 are not met then the third of optional instructions 304 (i.e., Cond br (errcode, errhandler)) performs a conditional branch to an error handling routine (i.e., errhandler) passing the error code (i.e., errcode) describing the event. By catching this condition, optional instructions 304 identifies a potential run-time error and possible source of problems.

An enhanced optional code scheduler 308 designed in accordance with implementations of the present invention attempts to schedule each of required instructions 302 and 306 along with as many of optional instructions 304 as permitted by the compilation overhead strategy as indicated. In one implementation, the target processor has multiple functional units capable of processing 6 instructions in parallel as indicated by instruction words 310, 312, and 314. Target processor could be a VLIW (very long instruction word) processor, an out-of-order processor or any other type of processor having multiple functional units available for executing instructions. At time t=0, enhanced optional scheduler 308 is able to schedule required instruction 302 for execution by the first functional unit of the target processor by placing required instruction 302 in slot position 1:1. Settling time requirements of the target processor do not allow the variable "P" to be referenced for a complete instruction cycle causing a "dead cycle" at time t=1. Consequently, enhanced optional scheduler 308 takes advantage of this situation and inserts optional instructions 304 at t=1 that check the address of the variable "P" and are not constrained by the settling time of the target processor. Since instruction word 312 would have been unused during this "dead time" there is no perceived degradation of performance when executing the fragment in FIG. 3 with or without optional instructions 304. Of course, once the settling time requirements are met than required instruction 306 scheduled in instruction word 314 is executed on the first functional unit of the target processor as indicated by its occupied slot position 3:1.

Various other scheduling strategies can be used in the event optional instructions 304 contain more instructions than available slots. In one implementation, enhanced optional scheduler 308 may eliminate one or more of the instructions in optional instructions 304 until they all fit within the available slots. This compilation overhead strategy would be consistent with the "no overhead strategy for optional instructions" as it would require that each optional instruction occupies an otherwise unusable slot in a processor schedule. Consistent with the same strategy, enhanced optional scheduler 308 might instead schedule optional instructions 304 out-of-order rather than in a sequence of slots within the processor schedule. In some cases, one or more of optional instructions 304 might even be scheduled after required instructions 302 and 306. This might risk delaying capturing runtime errors but at least would not impact executing the fragment at the expense of additional computations on the target processor.

If the compilation overhead strategy allows, enhanced optional scheduler 308 may be allowed to increase the computations by a specified percentage or amount. Both the "block-wise percentage limit strategy for optional instructions" and the "aggregate percentage limit strategy for optional instructions" would allow some increase in overhead. In both compilation overhead strategies, enhanced optional scheduler 308 would add one or more instructions from optional instructions 304 until the specified percentage limit indicated along with either of these or other strategies would be exceeded. As these examples are illustrative and not exhaustive, many other compilation strategies and scheduling techniques are contemplated in accordance with implementations of the present invention.

Figure 4:
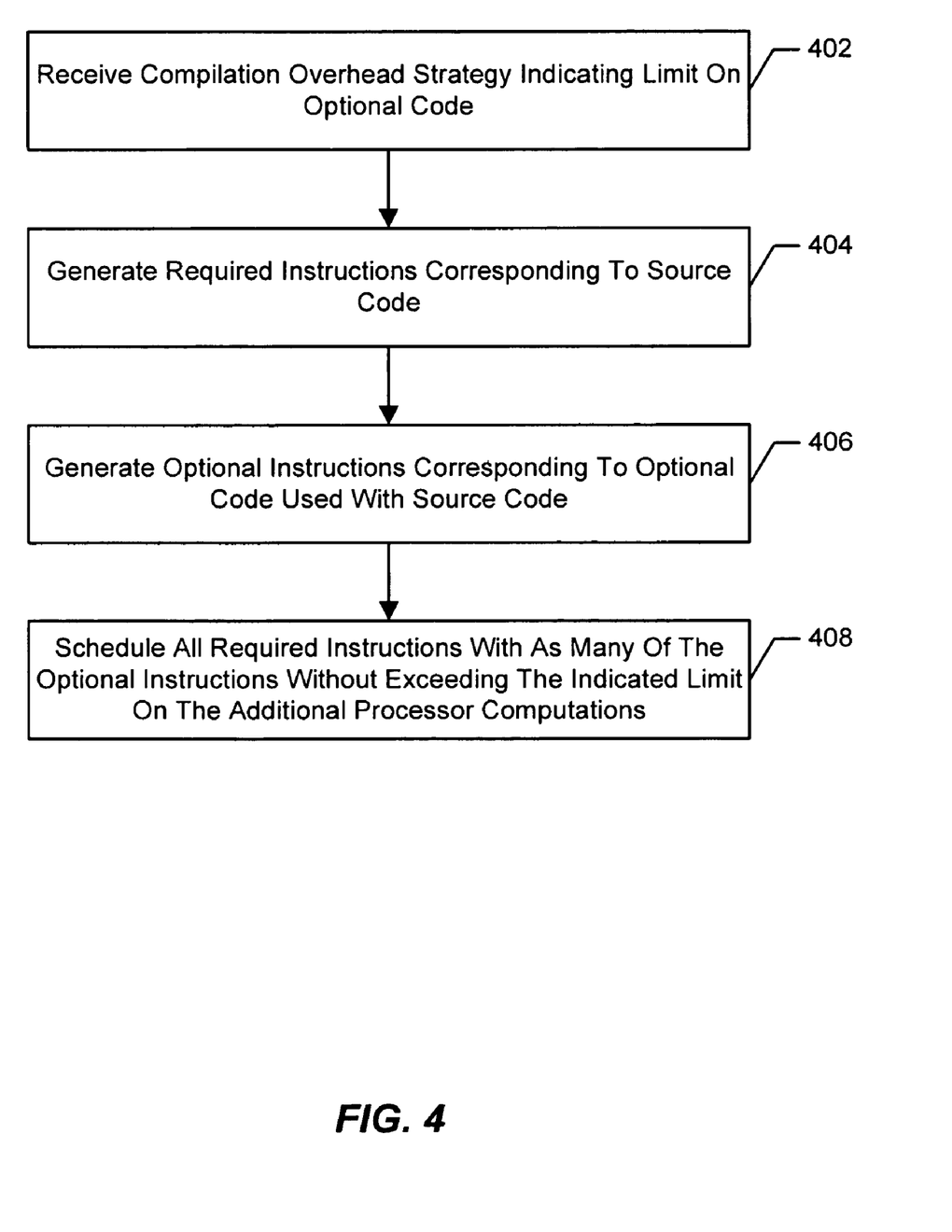
FIG. 4 is a flowchart diagram of the operations used to schedule both required and optional instructions in accordance with implementations of the present invention.

FIG. 4 is a flowchart diagram of the operations used to schedule both required and optional instructions in accordance with implementations of the present invention. As previously described, implementations of the present invention first receive a compilation overhead strategy indicating a limit on optional code to include in the executable (402). These compilation overhead strategies include: a no overhead strategy for optional instructions, block-wise percentage limit strategy for optional instructions, and an aggregate percentage limit strategy for optional instructions. Next, the compiler would generate required instructions corresponding to the source code (404) and generate the optional instructions corresponding to the optional code used with the source code (406). In some cases, all the required instructions are generated from the source code and then the optional instructions are generated. Alternatively, the required instructions could be generated in parallel with the optional instructions as the optional code could be interspersed with the required code. Yet another implementation might use two separate files or areas having the source code in the first area and the optional code in the second area allowing the required instructions and optional instructions to be created without any interdependencies.

Depending on the compilation strategy, an enhanced optional code scheduler or other components in the compiler would schedule all required instructions with as many of the optional instructions without exceeding the indicated limit on the additional processor computations (408). In the case of the "no overhead for optional instruction strategy", the scheduler schedules as many of the one or more optional instructions as possible provided that each optional instruction occupies an otherwise unusable slot in a processor schedule. In one implementation, the scheduler may decide to include or eliminate one or more optional instructions by analyzing the available slots on a block-by-block basis.

Alternatively, the scheduler could limit the optional instructions included in the processor schedule according to either the "block-wise percentage limit" or the "aggregate percentage limit on optional instructions". In the former case, the scheduler schedules as many of the one or more optional instructions in a basic block unless the block-wise percentage limit on optional instructions would be exceeded. For example, a 1% limit on optional instructions might allow the scheduler to add approximately one additional instruction word to a basic block having 100 instruction words of required instructions already scheduled.

The aggregate percentage limit on optional instructions in the latter case is like the former example except the scheduler is limited by the aggregate percentage of required instructions scheduled compared with the aggregate percentage of optional instructions to be scheduled. To keep track of the optional instructions scheduled, the compiler might keep a "checkbook" of available slots in the executable and balance the checkbook after the scheduler evaluates each basic block. This would allow more optional instructions to occupy one basic block while other basic blocks have fewer optional instructions as long as the aggregate number of optional instructions does not exceed a relative percentage amount specified.

Figure 5:
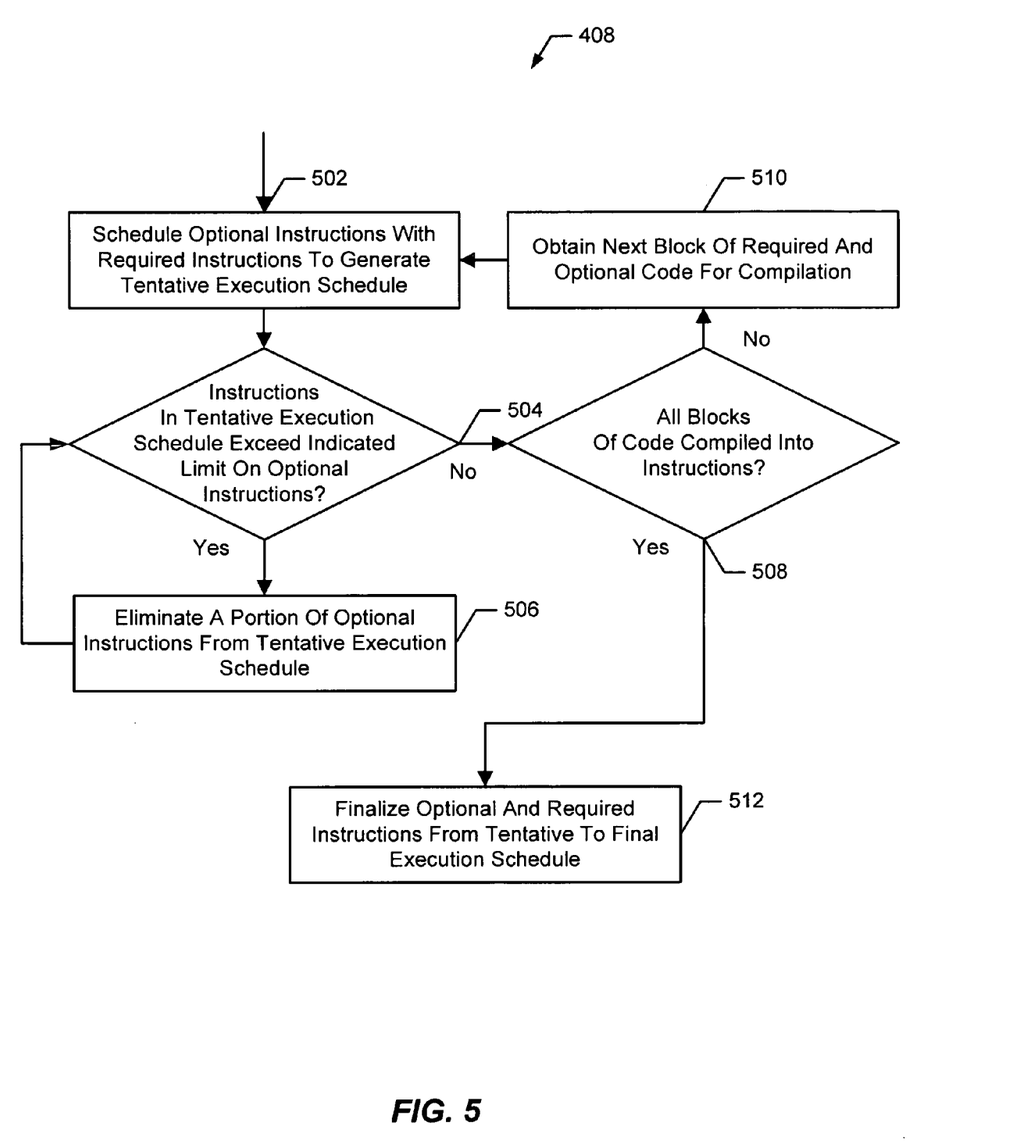
FIG. 5 is a flowchart diagram of the operations used to schedule one or more optional instructions in accordance with one implementation of the present invention.

FIG. 5 is a flowchart diagram of the operations used to schedule one or more optional instructions in accordance with one implementation of the present invention. It is contemplated that there are many ways to implement the scheduling of optional instructions consistent with aspects of the present invention. One example begins by scheduling the optional instructions with required instructions to generate tentative execution schedule (502). The tentative execution schedule includes all of both the required and optional instructions in an efficient manner yet does not initially consider the particular compilation strategy. At a minimum, the scheduler may check that the one or more slots of a schedule for a processor having multiple functional units left unoccupied by the required instructions are instead occupied by one or more optional instructions.

Next, the scheduler determines if the mixture of instructions in the tentative execution schedule exceed the indicated limit on optional instructions (504). Typically, the limit on optional instructions is based upon the additional processor computations required for executing the optional instructions rather than the absolute number of instructions. Measuring the additional computations required is a more effective measure as processing certain optional instructions may affect the overall performance to a greater or lesser extent depending on many factors.

In the event the optional instructions exceed the indicated limit, the scheduler eliminates a portion of the optional instructions from the tentative execution schedule (506), determines if the limit is met or exceeded (504) and repeats this process until the limit is met but not exceeded. One method for determining if the tentative execution schedule exceeds the specified limits includes comparing an additional set of processor computations for executing one or more optional code instructions with a required set of processor computations required for executing the required instructions without the optional instructions. In some cases, for example, it is conceivable that eliminating just one optional instruction allows the scheduler to re-schedule several other optional instructions in a computationally more efficient manner. Eventually, the scheduler checks whether all blocks of code have been compiled into instructions (508) and obtains the next block of required and optional code for compilation (510) or finalizes the optional and required instructions from the tentative execution schedule to a final execution schedule (512).

Figure 6:
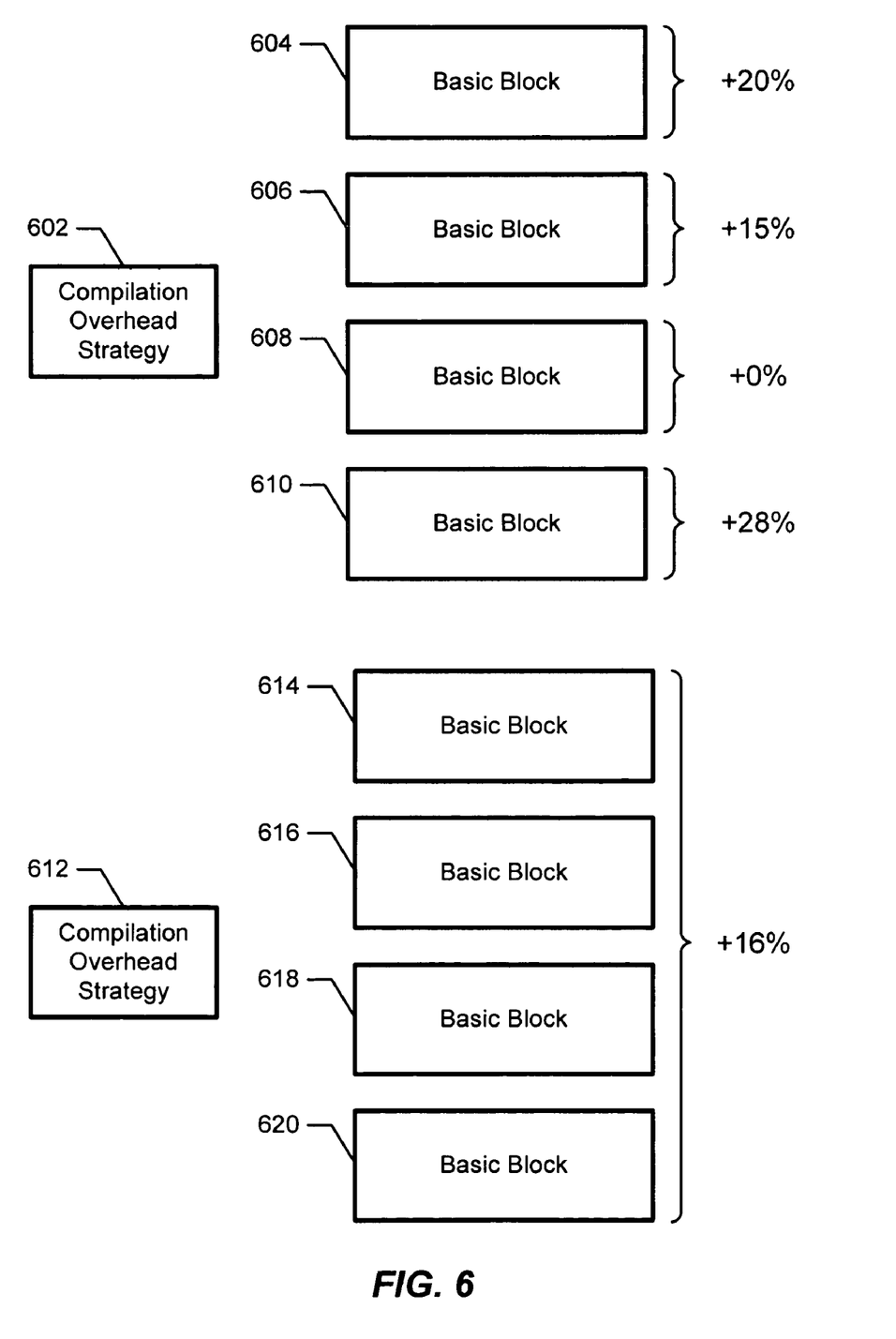
FIG. 6 is a schematic diagram illustrating two different compilation overhead strategies in accordance with implementations of the present invention.

FIG. 6 is a schematic diagram illustrating two different compilation overhead strategies in accordance with implementations of the present invention. In the first example, compilation overhead strategy 602 is compatible with the block-wise percentage limit on optional instructions. This compilation overhead strategy 602 indicates that no basic block shall increase processor computations more than 30% to accommodate optional instructions. Accordingly, a scheduler designed in accordance with the present invention includes additional optional codes in basic blocks 604, 606, 608, 610 that do not increase processor computations in each block by more than 20%, 15%, 0%, and 28% respectively.

Alternatively, the second example in FIG. 6 has a compilation overhead strategy 612 compatible with the aggregate percentage limit on optional instructions and indicates that the aggregate of processor computations shall not increase more than 20%. While it is not specified exactly, any one of basic blocks 614, 616, 618, and 620 can include optional instructions that cause a local increase in processor computations greater than 20% as long as the total or aggregate increase considering all of basic blocks 614, 616, 618, and 620 does not exceed this limit. Accordingly, the aggregate increase in processor computations totals 16% using one or more of the previously described strategies for limiting the computational overhead associated with processing the optional instructions in the target processor.

Figure 7:
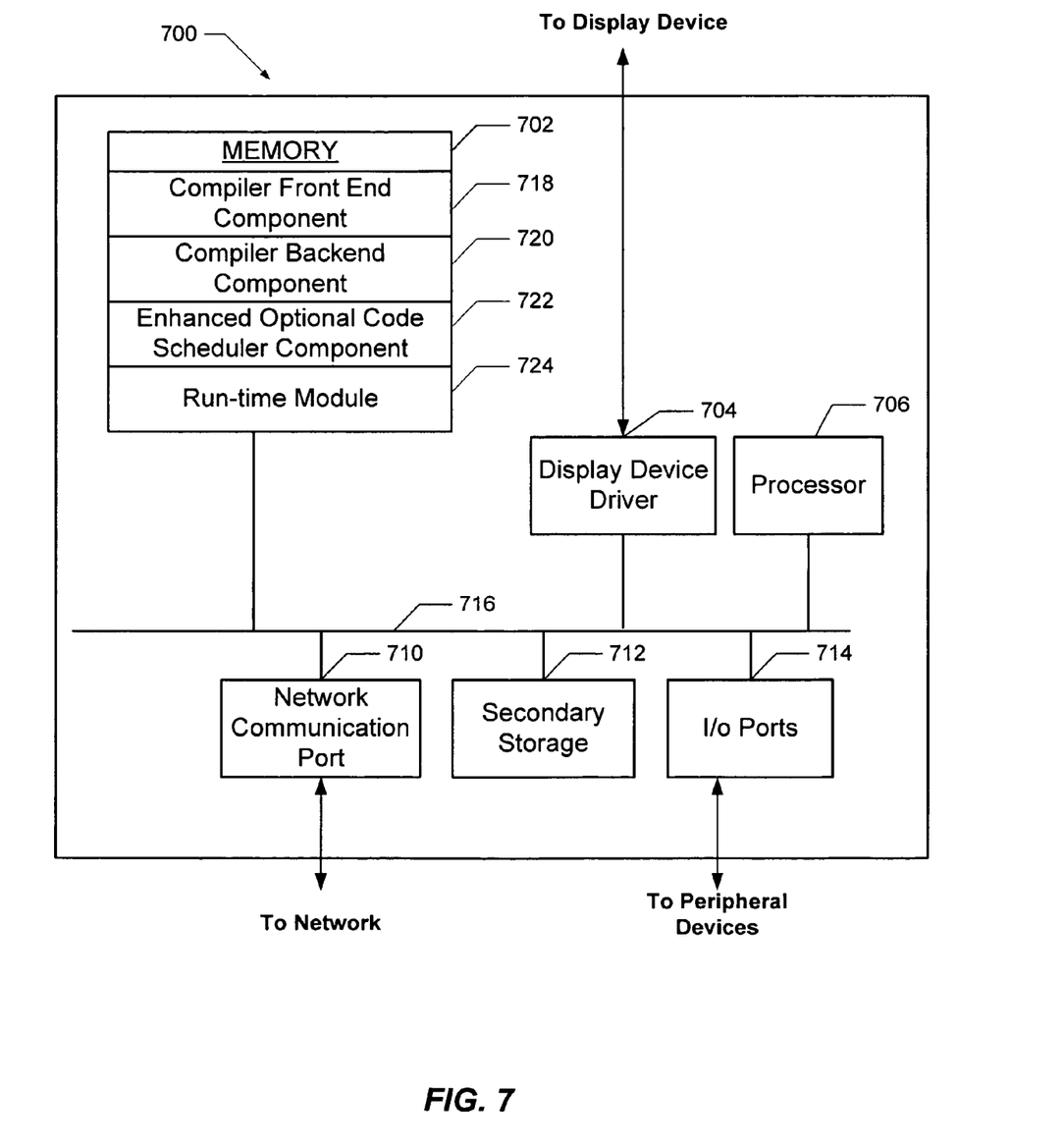
FIG. 7 is a schematic diagram of a development environment system and components used in accordance with one implementation of the present invention.

FIG. 7 is a schematic diagram of a development environment system 700, hereinafter system 700, and components used in accordance with one implementation of the present invention. System 700 includes a memory 702 to hold executing programs (typically random access memory (RAM) or read-only memory (ROM) such as a flash RAM), a display device driver 704 capable of interfacing and driving a display or monitor device, a processor 706, a network communication port 710 for data communication, a storage 712, and input/output (I/O) ports 714 also with I/O controller operatively coupled together over an interconnect 716. System 700 can be preprogrammed, in ROM, for example, using field-programmable gate array (FPGA) technology or it can be programmed (and reprogrammed) by loading a program from another source (for example, from a floppy disk, a CD-ROM, or another computer). Also, system 700 can be implemented using customized application specific integrated circuits (ASICs).

In one implementation, memory 702 includes a compiler front-end component 718, a compiler backend component 720, an enhanced optional code scheduler component 722 and a run-time module 724 that manages resources on system 700 and operation of the compiler. It is contemplated that enhanced optional code scheduler component 722 is part of either or both compiler front-end component 718 and compiler backend component 720 however it has been separated in FIG. 7 for purposes of discussion and illustration of one exemplary implementation.

While examples and implementations have been described, they should not serve to limit any aspect of the present invention. Accordingly, implementations of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs.

While specific embodiments have been described herein for purposes of illustration, various modifications may be made without departing from the spirit and scope of the invention. For example, implementations of the present invention are described for use with a processor having six functional units as many more slots in the processor schedule are typically available however alternate implementations could also be used with processors having a single functional unit, several functional units or many more than six functional units as described. Accordingly, the invention is not limited to the above-described implementations, but instead is defined by the appended claims in light of their full scope of equivalents.

What is claimed is:

1. A method of scheduling optional instructions in a compiler targeting a processor, comprising:
   indicating a limit on the additional processor computations that are available for executing an optional code;
   generating one or more required instructions corresponding to a source code and one or more optional instructions corresponding to the optional code used with the source code; and
   scheduling all of the one or more required instructions with as many of the one or more optional instructions as possible without exceeding the indicated limit on the additional processor computations for executing the optional code,
   wherein the indicated limit is specified in a compilation overhead strategy selected from a set of strategies including: a no overhead strategy for optional instructions, block-wise percentage limit strategy for optional instructions, and an aggregate percentage limit strategy for optional instructions.

2. The method of claim 1 wherein the scheduling further comprises, tentatively scheduling the one or more optional instructions with the one or more required instructions to generate a tentative execution schedule for the processor;
   determining if instructions in the tentative execution schedule exceed the indicated limit on additional processor computations for executing optional code; and
   eliminating a portion of optional instructions from the tentative execution schedule in response to the determination in the event the indicated limit on additional processor computations for executing the optional code is exceeded.

3. The method of claim 2 wherein determining if the tentative execution schedule exceeds the specified limits includes comparing an additional set of processor computations for executing one or more optional instructions with a required set of processor computations required for executing the required instructions without the optional instructions.

4. The method of claim 3 wherein the additional set of processor computations associated with the optional instructions and the required set of processor computations associated with the required instructions are measured for each basic block in a set of basic blocks.

5. The method of claim 3 wherein the additional set of processor computations associated with the optional instructions and the required set of processor computations associated with the required instructions are measured using an aggregate of processor computations in a set of basic blocks.

6. The method of claim 1 wherein the no overhead for optional instructions strategy schedules as many of the one or more optional instructions in a basic block as possible provided that each optional instructions occupies an otherwise unusable slot in a processor schedule.

7. The method of claim 1 wherein the block-wise percentage limit on optional instructions is a strategy that schedules as many of the one or more optional instructions in a basic block unless the block-wise percentage limit on optional instructions would be exceeded.

8. The method of claim 1 wherein the aggregate percentage limit on optional instructions is a strategy that schedules as many of the one or more optional instructions in a set of basic blocks unless the aggregate percentage limit on optional instructions compared with an aggregate percentage of required instructions would be exceeded.

9. The method of claim 1 wherein the optional code is selected from a set of optional codes including: debug codes, tracing and logging codes, and speculative run-time optimization codes.

10. The method of claim 1 wherein the optional instructions are scheduled in one or more slots of a schedule for a processor having multiple functional units.

11. The method of claim 10 wherein the processor having multiple functional units is selected from a set of processors including: a VLIW (very long instruction word) processor, an out-of-order processor, and any processor having multiple functional units available for executing instructions.

12. The method of claim 1 wherein one or more slots of a processor schedule for the processor having multiple functional units left unoccupied by the required instructions are instead occupied by scheduling one or more optional instructions.

13. An apparatus capable of scheduling optional instructions for execution, comprising:
a processor;
a memory capable of storing instructions executable on the processor, wherein the instructions are for indicating a limit on additional processor computations that are available for executing an optional code, and the instructions executable on the processor are also for generating one or more required instructions corresponding to a source code and one or more optional instructions corresponding to the optional code used with the source code, and for scheduling all of the one or more required instructions with as many of the one or more optional instructions as possible without exceeding the indicated limit on the additional processor computations for executing the optional code,
wherein the indicated limit is specified according to a compilation overhead strategy selected from a set of strategies including: a no overhead strategy for optional instructions, block-wise percentage limit strategy for optional instructions, and an aggregate percentage limit strategy for optional instructions.

14. The apparatus of claim 13 wherein the scheduling further comprises instructions that, tentatively schedule the one or more optional instructions with the one or more required instructions to generate a tentative execution schedule for the target processor;
determine if instructions in the tentative execution schedule exceed the indicated limit on additional processor computations for executing optional code; and
eliminate a portion of optional instructions from the tentative execution schedule in response to the determination in the event the indicated limit on additional processor computations for executing the optional code is exceeded.

15. The apparatus of claim 14 wherein the instructions that determine if the tentative execution schedule exceeds the specified limits further includes instructions that compare an additional set of processor computations for executing one or more optional instructions with a required set of processor computations required for executing the required instructions without the optional instructions.

16. The apparatus of claim 15 wherein the additional set of processor computations associated with the optional instructions and the required set of processor computations associated with the required instructions are measured for each basic block in a set of basic blocks.

17. The apparatus of claim 15 wherein the additional set of processor computations associated with the optional instructions and the required set of processor computations associated with the required instructions are measured using an aggregate of processor computations in a set of basic blocks.

18. The apparatus of claim 13 wherein the no overhead for optional instructions strategy schedules as many of the one or more optional instructions in a basic block as possible provided that each optional instructions occupies an otherwise unusable slot in a processor schedule.

19. The apparatus of claim 13 wherein the block-wise percentage limit on optional instructions is a strategy that schedules as many of the one or more optional instructions in a basic block unless the block-wise percentage limit on optional instructions would be exceeded.

20. The apparatus of claim 13 wherein the aggregate percentage limit on optional instructions is a strategy that schedules as many of the one or more optional instructions in a set of basic blocks unless the aggregate percentage limit on optional instructions compared with an aggregate percentage of required instructions would be exceeded.

21. The apparatus of claim 13 wherein the optional code is selected from a set of optional codes including: debug codes, tracing and logging codes, and speculative run-time optimization codes.

22. The apparatus of claim 13 wherein the optional instructions are scheduled in one or more slots of a schedule for a target processor having multiple functional units.

23. The apparatus of claim 22 wherein the target processor having multiple functional units is selected from a set of processors including: a VLIW (very long instruction word) processor, an out-of-order processor, and any processor having multiple functional units available for executing instructions.

24. The apparatus of claim 13 wherein one or more slots of a processor schedule for the target processor having multiple functional units left unoccupied by the required instructions are instead occupied by scheduling one or more optional instructions.

25. A computer program product for scheduling optional instructions in a compiler targeting a processor, tangibly stored on a computer readable medium, comprising instructions operable to cause a programmable processor to:
indicate a limit on the additional processor computations that are available for executing an optional code;
generate one or more required instructions corresponding to a source code and one or more optional instructions corresponding to the optional code used with the source code; and
schedule all of the one or more required instructions with as many of the one or more optional instructions as possible without exceeding the indicated limit on the additional processor computations for executing the optional code, wherein the indicated limit is specified in a compilation overhead strategy selected from a set of strategies including: a no overhead strategy for optional instructions, block-wise percentage limit strategy for optional instructions, and an aggregate percentage limit strategy for optional instructions.

26. The computer program product of claim 25 wherein the scheduling instructions further comprise instructions that,
tentatively schedule the one or more optional instructions with the one or more required instructions to generate a tentative execution schedule for the processor;
determine if instructions in the tentative execution schedule exceed the indicated limit on additional processor computations for executing optional code; and
eliminate a portion of optional instructions from the tentative execution schedule in response to the determination in the event the indicated limit on additional processor computations for executing the optional code is exceeded.

27. The computer program product of claim 26 wherein the no overhead for optional instructions strategy schedules as many of the one or more optional instructions in a basic block as possible provided that each optional instructions occupies an otherwise unusable slot in a processor schedule.

28. The computer program product of claim 26 wherein the block-wise percentage limit on optional instructions is a strategy that schedules as many of the one or more optional instructions in a basic block unless the block-wise percentage limit on optional instructions would be exceeded.

29. The computer program product of claim 26 wherein the aggregate percentage limit on optional instructions is a strategy that schedules as many of the one or more optional instructions in a set of basic blocks unless the aggregate percentage limit on optional instructions compared with an aggregate percentage of required instructions would be exceeded.

30. The computer program product of claim 26 wherein the instructions that determine if the tentative execution schedule exceeds the specified limits further includes instructions that compare an additional set of processor computations for executing one or more optional instructions with a required set of processor computations required for executing the required instructions without the optional instructions.

31. The computer program product of claim 30 wherein the additional set of processor computations associated with the optional instructions and the required set of processor computations associated with the required instructions are measured for each basic block in a set of basic blocks.

32. The computer program product of claim 30 wherein the additional set of processor computations associated with the optional instructions and the required set of processor computations associated with the required instructions are measured using an aggregate of processor computations in a set of basic blocks.

33. The computer program product of claim 25 wherein the optional code is selected from a set of optional codes including: debug codes, tracing and logging codes, and speculative run-time optimization codes.

34. The computer program product of claim 25 wherein the optional instructions are scheduled in one or more slots of a schedule for a processor having multiple functional units.

35. The computer program product of claim 34 wherein the processor having multiple functional units is selected from a set of processors including: a VLIW (very long instruction word) processor, an out-of-order processor, and any processor having multiple functional units available for executing instructions.

36. The computer program product of claim 25 wherein one or more slots of a processor schedule for the processor having multiple functional units left unoccupied by the required instructions are instead occupied by scheduling one or more optional instructions.

37. A computer apparatus for scheduling optional instructions in a compiler targeting a processor, comprising:
means for indicating a limit on the additional processor computations that are available for executing an optional code;
means for generating one or more required instructions corresponding to a source code and one or more optional instructions corresponding to the optional code used with the source code; and
means, including a processor, for scheduling all of the one or more required instructions with as many of the one or more optional instructions as possible without exceeding the indicated limit on the additional processor computations for executing the optional code, wherein the indicated limit is specified in a compilation overhead strategy selected from a set of strategies including: a no overhead strategy for optional instructions, block-wise percentage limit strategy for optional instructions, and an aggregate percentage limit strategy for optional instructions.

* * * * *